US008923283B2

(12) United States Patent
Matthews et al.

(10) Patent No.: US 8,923,283 B2
(45) Date of Patent: Dec. 30, 2014

(54) SCALABLE EGRESS PARTITIONED SHARED MEMORY ARCHITECTURE

(71) Applicant: Broadcom Corporation, Irvine, CA (US)

(72) Inventors: Brad Matthews, San Jose, CA (US); Bruce Kwan, Sunnyvale, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 120 days.

(21) Appl. No.: 13/628,751

(22) Filed: Sep. 27, 2012

(65) Prior Publication Data

US 2014/0086262 A1 Mar. 27, 2014

(51) Int. Cl.
*H04Q 11/00* (2006.01)
*H04L 12/28* (2006.01)
*H04L 12/54* (2013.01)

(52) U.S. Cl.
USPC ............ 370/363; 370/386; 370/412; 370/429

(58) Field of Classification Search
None
See application file for complete search history.

(56) References Cited

U.S. PATENT DOCUMENTS

| 6,137,807 | A | * | 10/2000 | Rusu et al. | 370/429 |
| 6,842,443 | B2 | * | 1/2005 | Allen et al. | 370/335 |
| 8,085,764 | B1 | * | 12/2011 | McCrosky et al. | 370/375 |
| 2003/0165147 | A1 | * | 9/2003 | Shimada | 370/412 |
| 2003/0198231 | A1 | * | 10/2003 | Kalkunte et al. | 370/395.31 |
| 2011/0252284 | A1 | * | 10/2011 | Sindhu et al. | 714/722 |

* cited by examiner

*Primary Examiner* — Ashley Shivers

(74) *Attorney, Agent, or Firm* — Oblon, Spivak, McClelland, Maier & Neustadt, L.L.P.

(57) ABSTRACT

Disclosed are various embodiments that provide an architecture of memory buffers for a network component configured to process packets. A network component may receive a packet, the packet being associated with a control structure and packet data, an input port set and an output port set. The network component determines one of a plurality of control structure memory partitions for writing the control structure, the one of the plurality of control structure memory partitions being determined based at least upon the input port set and the output port set; and determines one of a plurality of packet data memory partitions for writing the packet data, the one of the plurality of packet data memory partitions being determined independently of the input port set.

20 Claims, 5 Drawing Sheets

SCALABLE EGRESS PARTITIONED SHARED MEMORY ARCHITECTURE

BACKGROUND

A network component, such as a network switch, routes data from a source to a destination. For example, a network switch may receive network packets from a plurality of input ports and route these packets to a plurality of output ports. Packets entering the switch may be subject to scheduling according to packet priorities. As packets are absorbed by the switch for routing to one or more output ports of the switch, packets may need to be stored in various memory buffers. The storing of packets or any packet related information may consume time, thus, impacting the latency of processing packets in the switch.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
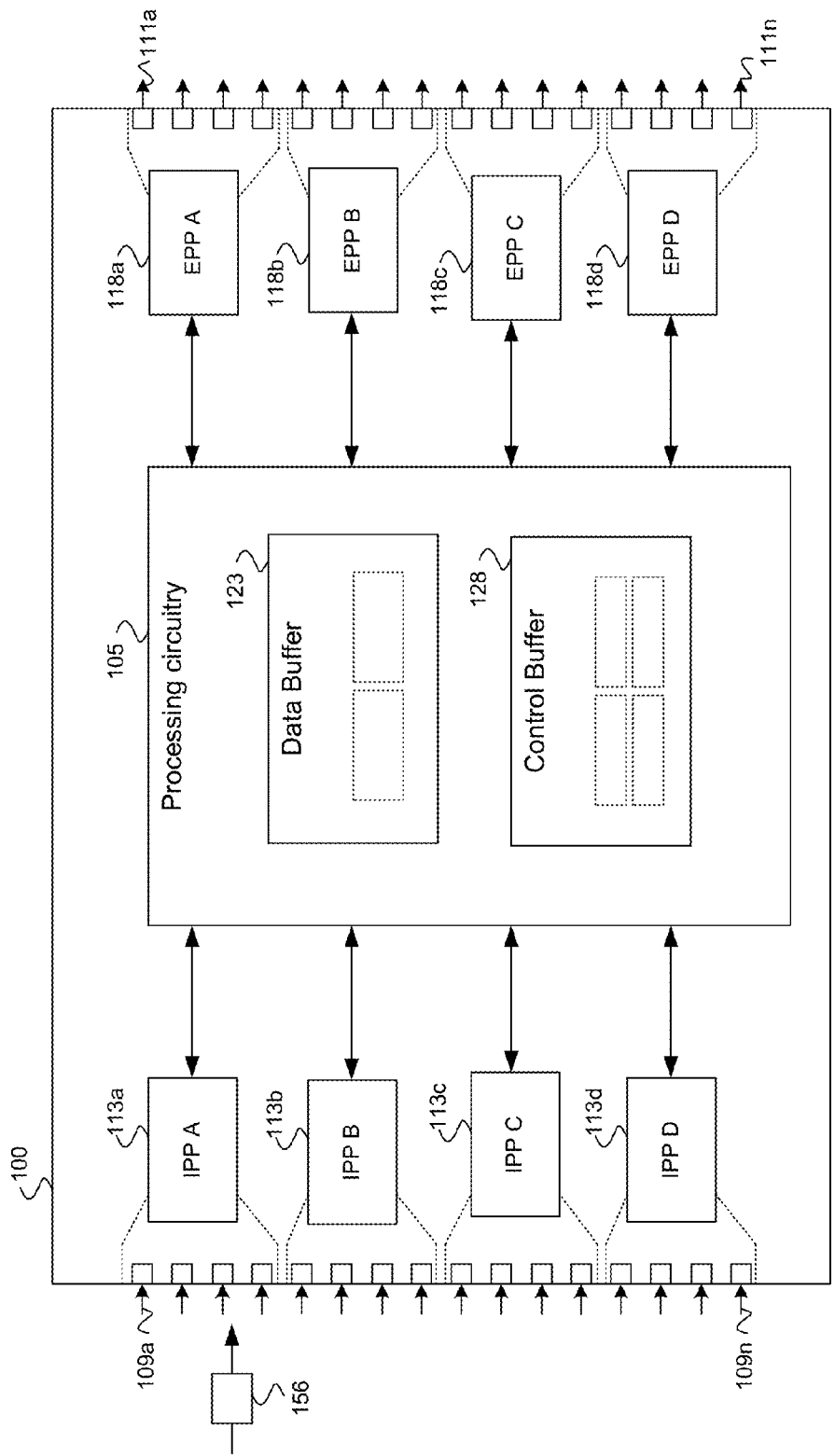
FIG. 1 is a drawing of a network component according to various embodiments of the present disclosure.

The present disclosure relates to organizing one or more memory buffers in a network component such as, for example, a network switch. Memory buffers are responsible for storing packet data and control information associated with incoming packets. By optimizing a memory buffer architecture, a network component may realize reduced latency in routing packets from input ports to output ports.

A memory buffer may be configured to receive data from a plurality of inputs. In this respect, the memory buffer may absorb data from a plurality of sources. However, under design constraints, a small portion of the sources may be given access to the memory buffer for a particular period of time. Put another way, the number of input sources that are allowed to write to the memory buffer for a particular clock period may be physically limited.

One solution to this problem is a time division access implementation. In this case, each input source is granted a window of time to access the memory buffer. A window of access time, or time slot, iteratively advances for each input source. In a time division access implementation, the speed at absorbing data from the plurality of input ports depends on a period of time it takes to receive data from an input port and the number of input ports. In the example of a network switch, the clock period for writing to a memory buffer is directly proportional to the port period and inversely proportional to the number of ports. The port period, may be a period of time allocated for a packet to arrive at the port. To this end, the data size of a packet, which contributes to the port period, may increase the clock period.

To optimize the clock period, the number of ports accessible to a memory buffer may be modified. In other words, a memory buffer may be divided into partitions. For example, a memory buffer configured to handle 100 ports may be divided into two partitions where each of the two partitions handles 50 ports. By partitioning a memory buffer, the absorption of data received from the ports is affected. It may be the case that dividing a memory buffer into a greater number of partitions is optimal for circumstances with a short port period. That is to say, if each port communicatively coupled to a highly partitioned memory buffer writes short pieces of data to the memory buffer, optimization between a number of partitions and data length may be achieved. Furthermore, when the port period is long, such that large pieces of data are being written by each port, then fewer partitions may be utilized to achieve optimization.

Various embodiments of the present disclosure are directed to applying asymmetrical partitioning scheme based on the information stored in the memory buffers of a network component. For example, a packet received by the network component may be associated with packet data and control structures. In various embodiments, the control structure is stored separately from the packet data. In this respect, the control structure is decoupled from the packet data. Control structure lengths may be shorter in length than packet data. To this end, decoupled control structures may be stored in a memory buffer with a large number of partitions. Moreover, packet data, which may be longer, is stored in a memory buffer with fewer partitions.

With reference to FIG. 1, shown is a network component 100 according to various embodiments. The network component 100 may correspond to a switch, a router, a hub, a bridge, or any other network device that is configured to facilitate the routing of network packets. The network component 100 is configured to receive one or more packets from a source and route these packets to one or more destinations. For example, the network component 100 may comprise one or more input ports 109a-n. Each input port 109a-n is configured to receive a network packet. The network component 100 also comprises a plurality of output ports 111a-n. A packet 156 may be received at an input port 109a-n and may eventually be outputted at one or more output ports 111a-n The network component 100 comprises sets of ingress packet processors 113a-d. Each ingress packet processor 113a-d may be configured to be bound to a subset of input ports 109a-n. In this sense, each ingress packet processor 113a-d corresponds to a respective input port set. In addition to associating an incoming packet to an input port set, the ingress packet processors 113a-d may be configured to process the incoming packet. For example the ingress packet processor may generate packet data for the packet.

The network component 100 also comprises sets of egress packet processors 118a-d. Each egress packet processor 118a-d may be configured to be bound to a subset of output ports 111a-n. In this sense, each egress packet processor 118a-d corresponds to a respective output port set. In addition to associating an outgoing packet to an output port set, the egress packet processors 118a-d may be configured to process the outgoing packet. For example the egress packet processor 118a-d may prepare the packet 156 for outbound transmission via one or more output ports 111a-n.

Incoming packets, such as those packets received by the input ports 109a-n, are processed by processing circuitry 105. In various embodiments, the processing circuitry 105 is implemented as at least a portion of a microprocessor. The processing circuitry 105 may include one or more circuits, one or more microprocessors, application specific integrated circuits, dedicated hardware, or any combination thereof. In yet other embodiments, processing circuitry 105 may include one or more software modules executable within one or more processing circuits. The processing circuitry 105 may further include memory configured to store instructions and/or code that causes the processing circuitry to execute data communication functions.

In various embodiments the processing circuitry 105 may be configured to prioritize, schedule, or otherwise facilitate routing incoming packets to one or more output ports 111a-111n. The processing circuitry 105 receives packets from one or more ingress packet processor 113a. The processing circuitry 105 performs packet scheduling and/or prioritization of received packets. To execute the functionality of the processing circuitry 105, one or more memory buffers may be utilized. For example, the processing circuitry 105 may comprise a data buffer 123 for buffering packet data. The processing circuitry 105 may also comprise a control buffer 128 for buffering control structures associated with a packet 156.

In various embodiments, the data buffer 123 is divided into a number of partitions and the control buffer 128 is divided into a number of partitions. The data buffer 123 and the control buffer 128 are configured to absorb data relating to incoming packets. The number of partitions for each buffer 123, 128 may be chosen to optimize packet information absorption. For example, the control buffer 128 may have a greater number of partitions than the data buffer 123.

After a packet 156 has been processed by the processing circuitry, 105, the processing circuitry 105 sends the processed packet 156 to one or more egress packet processors 118a-d for transmitting the packet 156 via one or more output ports 111a. To this end, the processing circuitry 105 is communicatively coupled to ingress packet processors 113a-d and egress packet processors 118a-d.

Although a number of ports/port sets are depicted in the example of FIG. 1, various embodiments are not so limited. Any number of ports and/port sets may be utilized by the network component 100. FIG. 1 provides a non-limiting example of dividing a number of ports to a set of ingress/egress packet processors.

Next, a general description of the operation of the various components of the network component 100 is provided. To begin, a packet 156 is received at one or the input ports 109a-n of the network component 100. The packet 156 is processed by one of the ingress packet processors 113a-d. For example, the ingress packet processor 113a-d associated with the input port 109a-n that received the packet 156 is responsible for processing the packet. In this respect, the ingress packet processor 113a-d that is bound to the receiving input port 109a-n associates the packet with a corresponding input port set.

The ingress packet processor 113a-d may analyze the information in the packet 156 and generate packet data for the packet. For example, the ingress packet processor 113a-d may analyze packet header information of the packet 156 to determine the packet data. Additionally, the ingress packet processor 113a-d may determine which input port 109 or which input port set received the packet 156 to generate packet data. Furthermore, packet data for the packet 156 may include any information relating to which output port or ports 111a-n or output port sets are scheduled for outbound transmission of the packet 156.

The processing circuitry 105 receives the packet 156 and any packet data associated with the packet 156. The processing circuitry 105 may be configured to determine one or more control structures for the packet 156. In various embodiments, the processing circuitry 105 applies a control structure mapping table to the packet 156 to identify one or more control structures. For example, the control structure mapping table may comprise a lookup table that associates packets of a particular input and/or output port set to a particular control structure.

The processing circuitry 105 is configured to separate or otherwise decouple the control structure from a corresponding packet 156. In various embodiments, the processing circuitry 105 stores the control structure in a control buffer 128 and stores the packet data of the packet in a data buffer 123. To this end, the processing circuitry 105 writes to a control buffer 128 and writes to a separate data buffer 123.

In addition, the processing circuitry 105 is configured to read from each of these buffers 123, 128 and perform various packet scheduling operations. Moreover, the processing circuitry 105 may combine, or otherwise bind the control data with the corresponding packet data to generate an assembled packet. By initially decoupling the control structure 234 from the packet data 203, the internal control data 209 may eventually be merged with the packet data 203. When combined or otherwise merged, the assembled packet may be sent to one or more appropriate egress packet processors 118a-d to effectuate the outbound transmission of the prioritized packet 156.

Figure 2:
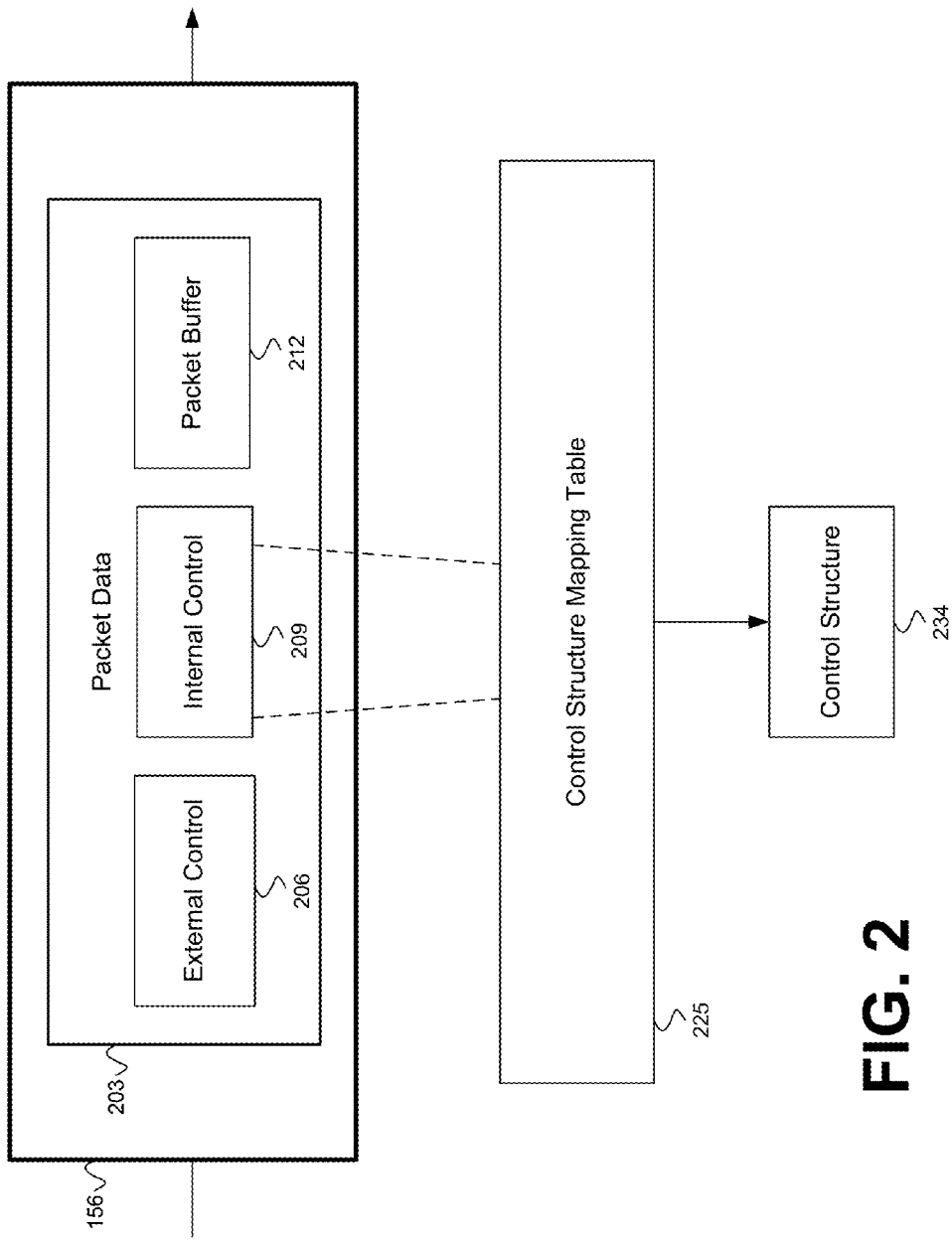
FIG. 2 is a drawing of an example of a packet transmitted via the network component of FIG. 1 according to various embodiments of the present disclosure.

Turning now to FIG. 2, shown is a drawing of an example of a packet 156 transmitted via the network component 100 of FIG. 1 according to various embodiments of the present disclosure. The packet 156 may comprise packet data 203. Packet data 203 may express the content of the packet. In other words, packet data 203 may be the substantive information that one device sends to another device over a network using the network component 100. In addition packet data 203 may also comprise external control data 206, internal control data 209, a packet buffer 212, or any other packet related information, such as, for example, a packet header.

In various embodiments, external control data 206 is protocol data or any other control data used globally by a network that contains the network component 100. Thus, a packet 156 received by the network component 100 may have pre-existing external control data 206.

The internal control data 209 may be generated by the network component for controlling the packet 156 locally within the network component 100. In various embodiments the internal control data 209 identifies the input port 109a-n (FIG. 1) and/or input port set that received the packet 156. Also the internal control data 209 may identify the output port 111a-n (FIG. 1) and/or output port set scheduled to transmit the packet 156. To this end, the internal control data 209 may express internal switch metadata generated by the network component 100 for the network component 100. An ingress packet processor 113a-d (FIG. 1) may be responsible for generating the internal control data 209 and including the generated internal control data 209 as packet data 203.

In various embodiments, the packet data 203 may also comprise a packet buffer 212. The packet buffer 212 may indicate the location of at least a portion of the packet data 203 may reside within the network component 100.

Processing circuitry 105 (FIG. 1) of the network component 100 may be configured to determine one or more control structures 234 by analyzing the internal control data 209 of a packet 156. A control structure 234 may specify one or more resources responsible for handling a corresponding packet 156 or portions of the packet 156. In this respect, the control structure 234 facilitates resource management and resource accounting based on priority, order, class, value, or any other classification of a given packet 156. According to various embodiments, a control structure 234 provides a linking of objects such as, memory buffers, priority queues, or other memory resources. When the processing circuitry 105 executes packet scheduling procedures, the processing circuitry 105 may use the control structure 234 to move a packet to an appropriate queue.

An appropriate control structure 234 may be specified by applying a control structure mapping table 225. In various embodiments, the control structure mapping table links an input port set and/or output port set to a control structure 234. To this end, a packet 156 associated with a particular input port set and/or output port set may be assigned a corresponding control structure 234. Thus, the processing circuitry 105 may apply the control structure mapping table 225 to a packet 156 to identify a corresponding control structure 234.

In various embodiments, rather than storing the control structure 234 with the packet data 203 in the same memory buffer, the control structure 234 may be decoupled or otherwise separated from the packet data 203. In this respect, the control structure 234 is stored in a control buffer 128 (FIG. 1) and the packet data 203 is stored in a data buffer 123 (FIG. 1).

Figure 3:
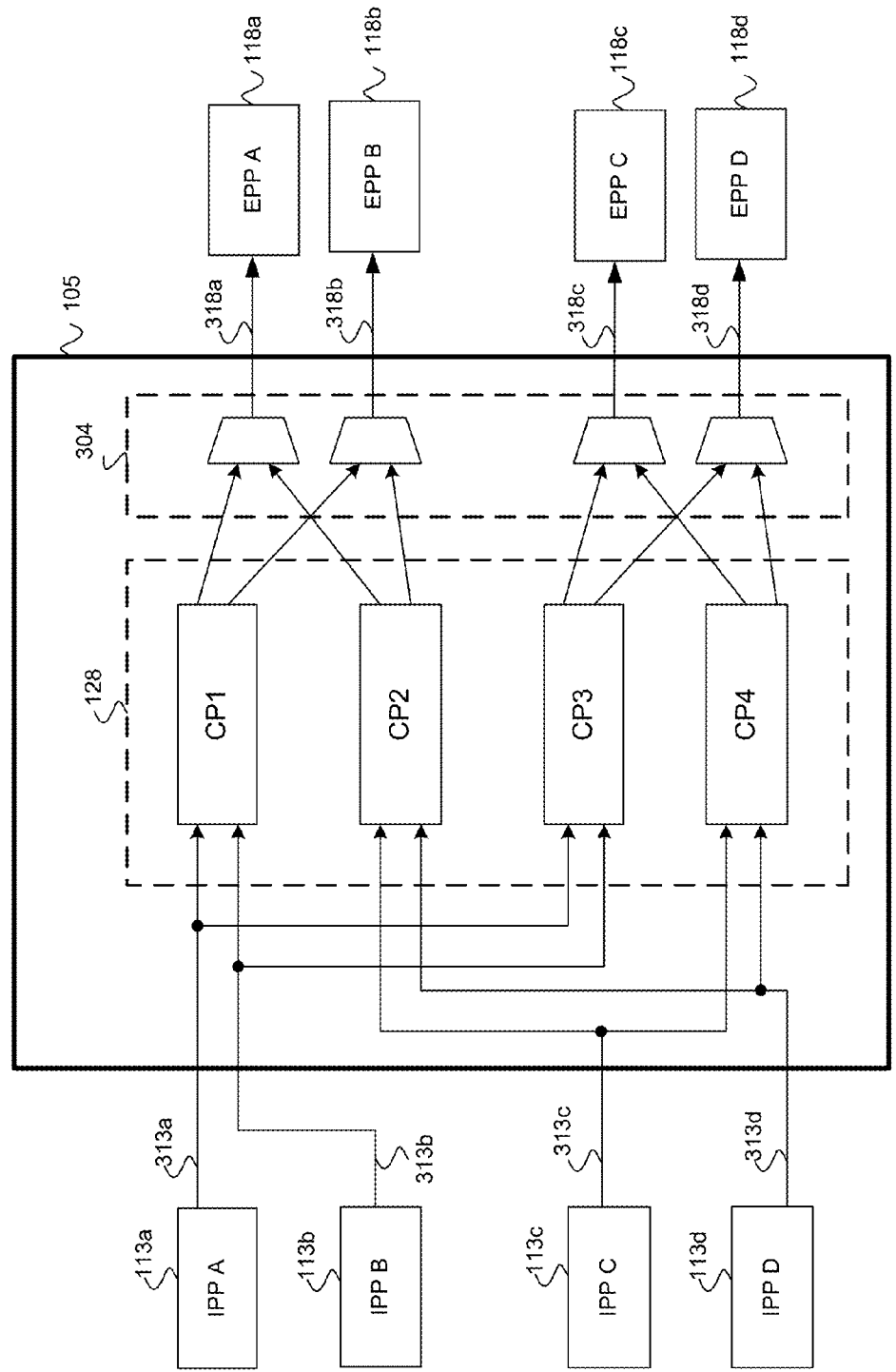
FIG. 3 is a drawing of an example of processing circuitry in the network component of FIG. 1 according to various embodiments of the present disclosure.

Moving to FIG. 3, shown is a drawing of an example of processing circuitry 105 in the network component 100 of FIG. 1 according to various embodiments of the present disclosure. Moreover, FIG. 3 provides a non-limiting example of the functionality and implementation of a control buffer 128 for buffering control structures 234 (FIG. 2).

FIG. 3 provides an example of the processing circuitry 105 that is configured to receive packets from a plurality of ingress packet processors 113a-d. Each ingress packet processor 113a-d represents a respective input port set 313a-d. Additionally, the processing circuitry 105 is configured to send processed packets to one or more egress packet processors 118a-d. Each egress packet processor 118a-d represents a respective output port set 318a-d.

Furthermore, the processing circuitry 105 comprises a control buffer 128. The processing circuitry 105 may write control structures 234 (FIG. 2) to the control buffer 128 and read control structures 234 from the control buffer 128. The control buffer 128 is divided into a number of partitions, CP1, CP2, CP3, and CP4. Although four partitions are depicted, any number of partitions may be used to make up the control buffer 128.

Before transmitting control structures to the egress packet processors 118a-d, the processing circuitry 105 may employ a set of scheduling components 304 that read control structures 234 from the control buffer 128 and perform scheduling operations.

The example of FIG. 3 demonstrates a control structure memory buffer that is ingress partitioned and egress partitioned. A buffer that is partitioned according to ingress and egress may be referred to as a cross point scheme. In ingress partitioning, each available input port set 313a-d corresponds to a subset of partitions. For example, as seen in FIG. 3, the first input port set 313a and the second input port set 313b are communicatively coupled to a first partition, CP1 and third partition, CP3. Consequently, the second partition CP2 and fourth partition CP4 are not communicatively coupled to these two input port sets 313a, b. Instead, CP2 and CP4 are communicatively coupled to the third and fourth input port sets 313c, d. Thus, the partition scheme of FIG. 3 is an example of partitioning input port sets 313a-d according to ingress.

In other words, each partition is dedicated to one or a subset of input port sets 313a-d. For example, CP1 only receives control structures 234 from the first input port set 313a and the second input port set 313b. Although additional input port sets 313c, d remain, CP1 is not communicatively coupled to these remaining input port sets 313c, d.

FIG. 3 also provides an example of egress partitioning. In egress partitioning, each available out port set 318a-d corresponds to a subset of partitions. For example, as seen in FIG. 3, the first output port set 318a and the second output port set 318b are communicatively coupled to CP1 and CP2. Consequently, CP3 and CP4 are not communicatively coupled to these two output port sets 318a, b. Instead, CP3 and CP4 are communicatively coupled to the third and fourth output port sets 318c, d. Thus, the partition scheme of FIG. 3 is an example of partitioning output port sets 318a-d according to egress.

That is to say, each partition is dedicated to one or a subset of output port sets 318a-d. For example, CP1 only sends control structures 234 to the first output port set 318a and the second output port set 318b. Although additional output port sets 318c, d remain, CP1 is not communicatively coupled to these remaining output port sets 318c, d.

In another example, CP3 is configured to only send control structures 234 to the third output port set 318c and the fourth output port set 318d. In this regard, CP3 may receive packets from the first or second input port sets 313a, b and packets may be sent to a third or fourth output port set 318c, d.

Accordingly, the control structure memory buffer may be both ingress and egress partitioned. This allows for a first subset of the control structure memory buffer partitions (e.g., CP1 and CP3, etc.) to be communicatively coupled to one of a plurality of input port sets (e.g., the first input port set 313a, etc.) such that a second subset of the control structure memory buffer partitions (e.g., CP3 and CP4, etc.) is communicatively coupled to one of a plurality of output port sets (e.g., the fourth output port set 318d, etc.). In this respect, the second subset partially overlaps with the first subset. Or in other words, the first subset and the second subset share one or more partitions (e.g., CP3, etc.).

Figure 4:
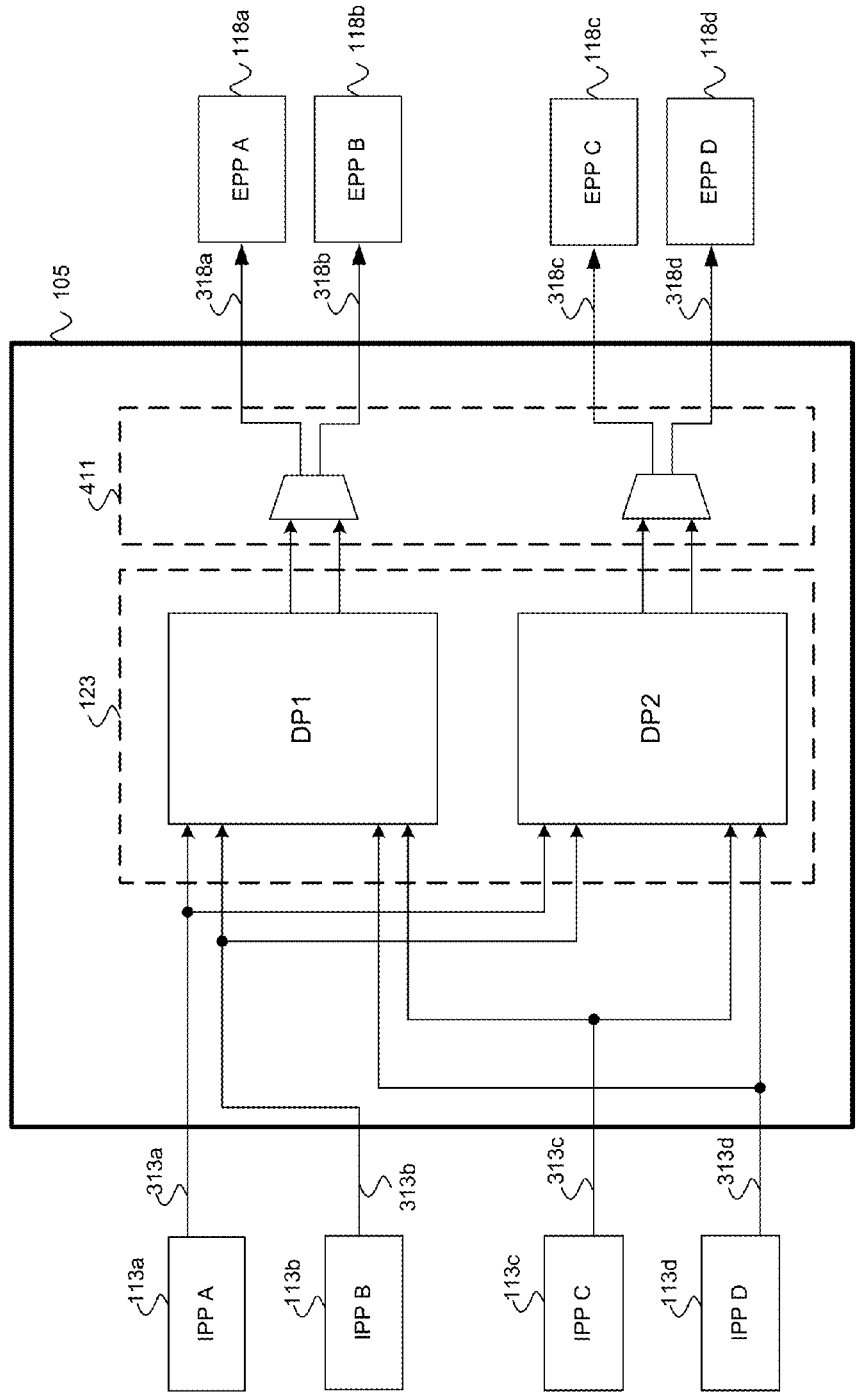
FIG. 4 is a drawing of an example of processing circuitry in the network component of FIG. 1 according to various embodiments of the present disclosure.

Turning to FIG. 4, shown is a drawing of an example of processing circuitry 105 in the network component 100 of FIG. 1 according to various embodiments of the present disclosure. Moreover, FIG. 4 provides a non-limiting example of the functionality and implementation of a data buffer 123 for buffering packet data 203 (FIG. 2).

FIG. 4 provides an example of the processing circuitry 105 that is configured to receive packets from a plurality of ingress packet processors 113a-d. Each ingress packet processor 113a-d represents a respective input port set 313a-d. Additionally, the processing circuitry 105 is configured to send processed packets to one or more egress packet processors 118a-d. Each egress packet processor 118a-d represents a respective output port set 318a-d.

Furthermore, the processing circuitry 105 comprises a data buffer 123. The processing circuitry 105 may write packet data 203 to the data buffer 123 and read packet data 203 from the data buffer 123. The data buffer 123 is divided into a number of partitions, DP1 and DP2. Although two partitions are depicted, any number of partitions may be used to make up the data buffer 123.

Before transmitting packet data 203 to the egress packet processors 118a-d, the processing circuitry 105 may employ a set of scheduling components 411 that prioritize reading packet data 203 from the data buffer 123.

The example of FIG. 4 demonstrates a packet data memory buffer that is egress partitioned and not ingress partitioned. A buffer that is partitioned according to egress and not ingress may be referred to as an enhanced cross point scheme.

In egress partitioning, each available out port set 318a-d corresponds to one or a subset of partitions. For example, as seen in FIG. 4, the first output port set 318a and the second output port set 318b are communicatively coupled to DP1. Consequently, DP2 is not communicatively coupled to these two output port sets 318a, b. Instead, DP2 is communicatively coupled to the third and fourth output port sets 318c, d. Thus, the partition scheme of FIG. 3 is an example of partitioning output port sets 318a-d according to egress.

Put a different way, each partition is dedicated to one or a subset of output port sets 318a-d. For example, DP1 only sends packet data 203 to the first output port set 318a and the second output port set 318b. Although additional output port sets 318c, d remain, DP1 is not communicatively coupled to these remaining output port sets 318c, d. In another example, DP2 is configured to only send packet data 203 to the third output port set 318c and the fourth output port set 318d.

FIG. 4 also provides a non-limiting example of a memory buffer that is not ingress partitioned. When a memory buffer is not ingress partitioned, each partition of the memory buffer is communicatively coupled to each input port set 313a-d. For example, DP1 is configured to receive packet data 203 from any of the four input port sets 313a-d. Similarly, DP2 is also configured to receive packet data from any input port set 313a-d. Thus, as seen in the example of FIG. 4, the packet data memory buffer may be partitioned according to egress and not ingress.

Partitioning the data buffer 123 by egress only may lead to a fewer number of partitions. This, for example, may result in a more optimized partition scheme. Packet data 203 may be long such that it is associated with a large port period. Accordingly, using a partition scheme that uses a large number of partitions may result in unfavorable data absorption by the data buffer 123. Thus, it may be the case that a partition scheme with fewer partitions is more suitable for packet data 203.

Similarly, a partition scheme that is ingress partitioned and egress partitioned, as seen in the example of FIG. 3, results in a larger number of memory buffer partitions. Although this would be less suitable for packet data 203, which may be long, an ingress and egress partitioned memory buffer may be more suitable for control structures 234 (FIG. 2) which may be shorter in length than packet data 203. That is to say, control structures 234 may be associated with short port periods. Thus, control structures 234 may use a different partition scheme than packet data 203.

Because, control structures 234 and corresponding packet data 203 are decoupled and buffered in respective memory buffers 123, 128 (FIG. 1), the control data, such as internal control data 209, and packet data 203 may eventually need to be bound together after performing read operations on the respective memory buffers 123, 128. To combine control data to corresponding packet data 203, a mapping table may be used by the processing circuitry 105. For example, a mapping table may associate the source and/or destination of packet data 203 to an address or location of corresponding control data. The source or destination may be, for example, a particular port 109a-n (FIG. 1), 111a-n (FIG. 1), or a port set 313a-d, 318a-d.

Figure 5:
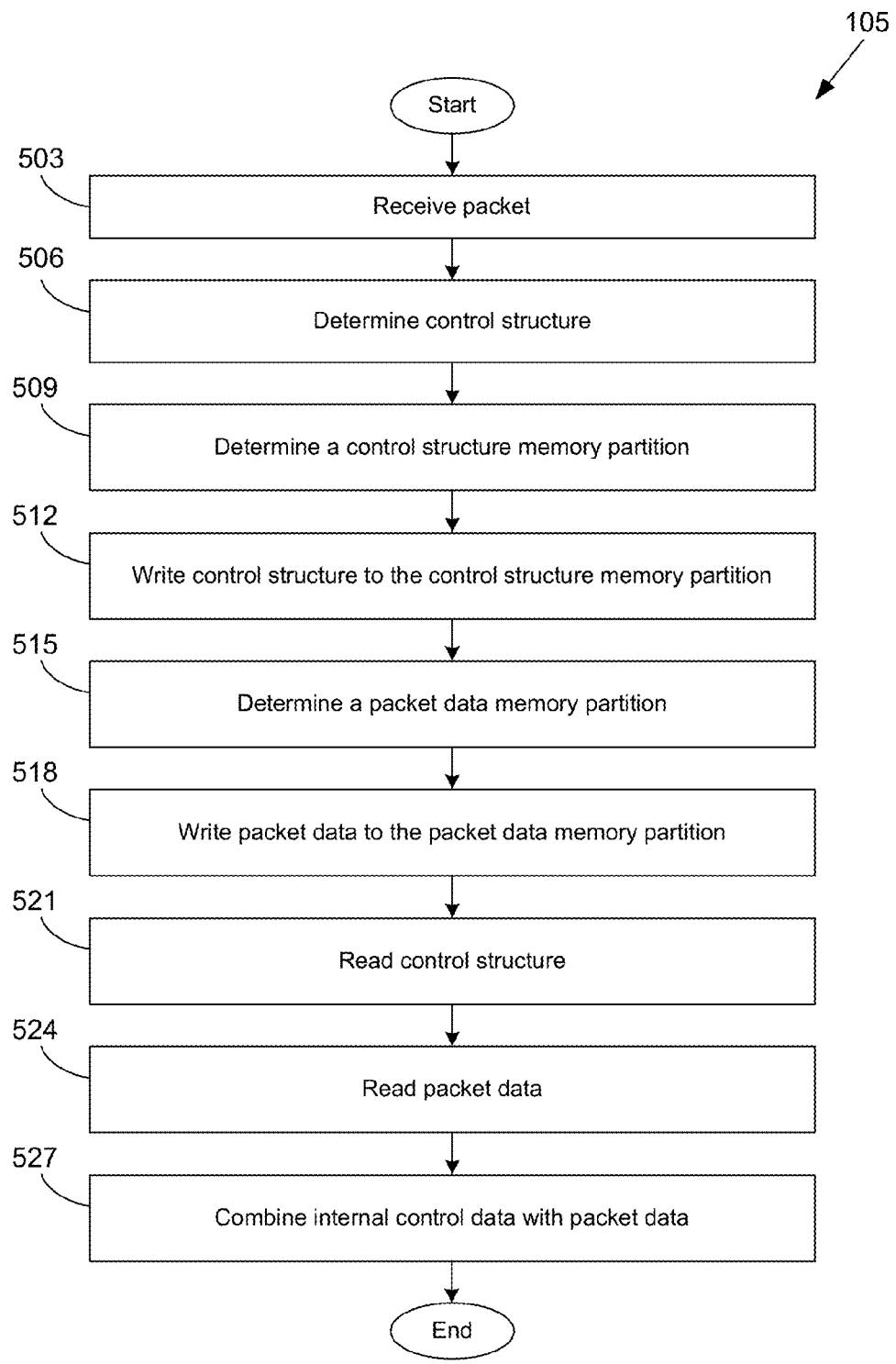
FIG. 5 is a flowchart illustrating one example of functionality implemented as portions of the processing circuitry in the network component of FIG. 1 according to various embodiments of the present disclosure.

Turning now to FIG. 5, shown is a flowchart that provides one example of the operation of a portion of the logic executed by the processing circuitry 105 according to various embodiments. It is understood that the flowchart of FIG. 5 provides merely an example of the many different types of functional arrangements that may be employed to implement the operation of the portion of the logic executed by the processing circuitry 105 as described herein. As an alternative, the flowchart of FIG. 5 may be viewed as depicting an example of steps of a method implemented in the processing circuitry 105 according to one or more embodiments.

Beginning at reference number 503, the processing circuitry 105 receives a packet 156 (FIG. 1). The packet 156 may have been received by one of a plurality of input ports 109a-n (FIG. 1). In various embodiments, the packet 156 is processed by an ingress packet processor 113a-d. The ingress packet processor 113a-d associates the packet with a corresponding input port set 313a-d (FIG. 3). Furthermore, the ingress packet processor generates internal control data 209 for the packet 156 based on packet data 203 of the packet 156. Accordingly, when the processing circuitry 105 receives the packet 156, the packet contains internal control data 209 such as, for example, switch metadata that specifies an input port set 313a-d and/or output port set 318a-d (FIG. 3).

At reference number 506, the processing circuitry 105 determines one or more control structures 234 (FIG. 2) for the packet 156. A control structure 234, for example, may comprise a priority value for associating the packet with a priority queue. In various embodiments, the processing circuitry 105 determines a control structure 234 by mapping the internal control data 209 to the control structure 234. For example, the processing circuitry 105 accesses a control structure mapping table 225 to identify the appropriate control structure 234 for the back. The control structure 234 may be mapped according to which input port 109a-n, output port 111a-n (FIG. 1), input port set 313a-d, and/or output port set 318a-d is associated with the packet 156.

At reference number 509, the processing circuitry 105 determines a partition of control buffer 128 (FIG. 1) for buffering the control structure 234. This determination may be made based on the physical connectivity between an input port set 313a-d and a control buffer partition as well as an output port set 318a-d and the control buffer partition. That is to say, the input port set 313a-d and output port set 318a-d guide the processing circuitry 105 to determine an appropriate control structure memory partition. In this respect, the partitions of the control buffer 128 are partitioned according to ingress and egress. Then, at reference number 512, the processing circuitry 105 writes the control structure 234 to the determined control structure memory partition.

At reference number 515, the processing circuitry 105 determines a partition of data buffer 123 (FIG. 1) for buffering the packet data 203. This determination may be made based on the physical connectivity between which output port set 318a-d is communicative coupled to which control buffer partition. Thus, the output port set 318a-d associated with the packet 156 directs the processing circuitry 105 in determining which partition of the data buffer 123 should be selected for buffering. In various embodiments, the data buffer 123 is partitioned according to egress only rather than partitioned according to ingress and egress. In this case, a packet data memory buffer is determined independently of the input port set 313a-d associated with packet 156. In other words, a packet data buffer partition is determined regardless of the input port set 313a-d that received the packet 156. Then, at reference number 518, the processing circuitry 105 writes the packet data 203 to the determined packet data memory partition.

At reference number 521, the processing circuitry 105 reads the control structure 234 from the control buffer 128 and at reference number 524; the processing circuitry 105 reads the packet data 203 from the data buffer 123. At reference number 527, the processing circuitry combines internal control data 209 with the packet data 203. For example, the processing circuitry 105 applies a mapping table for combining the packet data 203 with the internal control data 209 according to a control structure 234 by analyzing source and/or destination ports of the packet.

Embodiments of the present disclosure that are directed to determining whether a value is not less than a predetermined threshold value merely provide examples of one implementation. Similar results may be achieved using alternative implementations of comparing a value against a predetermined threshold value.

The processing circuitry 105 and other various systems described herein may be embodied in software or code executed by general purpose hardware. As an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 5 shows the functionality and operation of an implementation of portions of the processing circuitry 105 implemented by the network component 100 (FIG. 1). If embodied in software, each reference number, represented as a block, may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the processing circuitry 105, ingress packet processors 113a-d, and egress packet processors 118a-d, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system comprising:
processing circuitry configured to:
receive a packet transmitted through one of a plurality of input port sets, the packet comprising packet data;
determine a control structure for the packet based at least upon the packet data;
write the control structure to a control structure memory buffer, the control structure memory buffer being divided into a first number of partitions; and
write the packet data to a packet data memory buffer, the packet data memory buffer being divided into a second number of partitions,
wherein the first number of partitions is greater than the second number of partitions.

2. The system of claim 1, wherein each of the second number of partitions of the packet data memory buffer is communicatively coupled to the one of the plurality of input port sets.

3. The system of claim 2, wherein the packet is associated with one of a plurality of output port sets, wherein a subset of the second number of partitions of the packet data memory buffer is communicatively coupled to the one of the plurality of output port sets.

4. The system of claim 1, wherein a first subset of the first number of partitions of the control structure memory buffer is communicatively coupled to the one of a plurality of input port sets, wherein a second subset of the first number of partitions of the control structure memory buffer is communicatively coupled to the one of a plurality of output port sets, and wherein the second subset partially overlaps with the first subset.

5. The system of claim 1, wherein the processing circuitry is further configured to combine the packet data and internal control data based at least upon a mapping table.

6. The system of claim 5, wherein the mapping table is configured to map the packet data according to a source port associated with the packet and a destination port associated with the packet.

7. The system of claim 1, wherein the packet data comprises internal switch metadata, the internal switch metadata being defined based at least upon the one of the plurality of input port sets and one of a plurality of output port sets associated with the packet.

8. The system of claim 7, wherein the processing circuitry is further configured to determine the control structure of the packet based at least upon applying a control structure mapping table, the control structure mapping table being configured to map at least a portion of the internal switch metadata of the packet to a location of a corresponding control structure.

9. The system of claim 1, wherein the control structure comprises a priority value for associating the packet with a priority queue.

10. A system comprising:
  a plurality of input ports divided into a plurality of input port sets;
  a control structure memory buffer comprising a first number of control structure memory buffer partitions, each input port set of the plurality of input port sets being communicatively coupled to a respective subset of the control structure memory buffer partitions;
  a packet data memory buffer comprising a second number of packet data memory buffer partitions, each input port set of the plurality of input port sets being communicatively coupled to each of the packet data memory buffer partitions; and
  processing circuitry configured to:
    receive a packet, the packet being associated with one of the plurality of input port sets, the packet including packet data, and the packet corresponding to a control structure,
    write the control structure to one of the control structure memory buffer partitions, and
    write the packet data to one of the packet data memory buffer partitions.

11. The system of claim 10, further comprising a plurality of output ports divided into a plurality of output port sets, wherein the packet is further associated with one of the plurality of output port sets.

12. The system of claim 11, wherein the processing circuitry is configured to write the control structure to the one of the control structure memory buffer partitions based at least upon the one of the plurality of input port sets and the one of the plurality of output port sets.

13. The system of claim 11, wherein the processing circuitry is configured to write the packet data to the one of the packet data memory buffer partitions based at least upon the one of the plurality of output port sets.

14. The system of claim 13, wherein a length of the packet data is greater than a length of the control structure.

15. The system of claim 10, wherein the first number of the control structure memory buffer partitions is greater than the second number of the packet data memory buffer partitions.

16. A method comprising:
  receiving a packet, the packet being associated with a control structure, packet data, an input port set, and an output port set;
  determining one of a plurality of control structure memory partitions to write the control structure, the one of the plurality of control structure memory partitions being determined based at least upon a first connectivity between the input port set and the plurality of control structure memory partitions and a second connectivity between the output port set and the plurality of control structure memory partitions; and
  determining one of a plurality of packet data memory partitions to write the packet data, the one of the plurality of packet data memory partitions being determined based on a fourth connectivity between the output port set and the plurality of packet data memory partitions and independently of a third connectivity between the input port set and the plurality of packet data memory partitions.

17. The method of claim 16, wherein the one of the plurality of packet data memory partitions is determined based at least upon the output port set.

18. The method of claim 16, wherein a first number of the control structure memory partitions is greater than a second number of the packet data memory partitions.

19. The method of claim 16, wherein the control structure is determined by mapping at least a portion of the packet data to the control structure.

20. The method of claim 19, wherein the control structure facilitates priority queue management according to a priority value associated with the packet.

* * * * *